Figure 1:
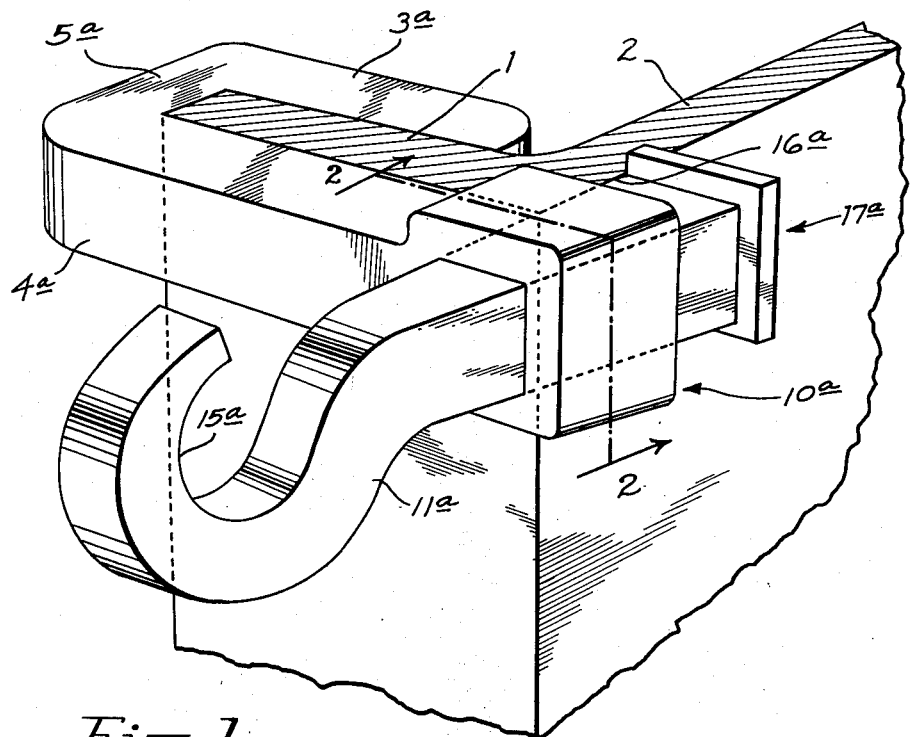

INVENTOR.
William A. Meighan
and Tirey L. Hume

Patented Aug. 10, 1954

2,685,849

UNITED STATES PATENT OFFICE 2,685,849

TUNNEL SHIP CLAMP

William A. Meighan, Oswego, and Tirey L. Hume, Portland, Oreg.

Original application June 6, 1950, Serial No. 166,495. Divided and this application October 15, 1951, Serial No. 251,414

6 Claims. (Cl. 105—369)

This invention relates to a two piece ship clamp for gripping both the web and inboard flange of a ship hull rib so that cables or straps can be secured thereto and stretched across the ship hold or attached to pieces of cargo to inhibit cargo shift. Specifically, this invention is a division of our copending application Serial Number 166,495, now Patent No. 2,675,265, dated April 13, 1954, filed June 6, 1950, and entitled Ship Clamp.

One object of our invention is to provide a two piece ship clamp which requires a minimum application of force to effect an initial grip on the hull rib so that a workman may fix the clamp in place while he swings precariously from a sling or stands upon other insecure support.

All ocean-going cargo vessels must be protected against the ever present danger that the cargo being transported may shift about and cause the vessel to list. This danger, if allowed to materialize during a storm or the running of a high sea, may cause the cargo to slide or shift about in the hold and change the ship's center of gravity as the ship pitches or rolls from side to side. In extreme cases, a cargo of fungible goods has been known to flow to one side causing the ship to list or heel dangerously. With non-fungible or concentrated pieces of cargo, such as heavy machinery, damage is produced when the machinery breaks loose and slides about in the hold. The conventional provisions against such cargo shift vary with the cargo type. Thus, with heavy machinery or other concentrated pieces of cargo, heavy cables or metal straps are secured between the individual pieces of cargo and the hull ribs or deck cleats. With a fungible cargo, however, the hold conventionally is divided into two or more smaller interconnected compartments by forming a temporary fore-and-aft bulkhead or baffle network across the hold with spaced timbers or planks. The fungible cargo is then loaded by being discharged over this temporary structure so timbers divided the fungible mass and serve as baffles to inhibit lateral movement thereof.

Before the price of timber rose to its present high level, temporary bulkheads or baffles were secured in place with transverse timber "shoring" members. Recently, however, this timber "shoring" has been eliminated by securing the vertical baffle plates to the ship ribs with metal straps or cables. Whatever type of cargo is to be secured against shifting, it will be noted that some means must be provided to secure the metal straps or cables to the ship hull ribs. That is to say, a ship clamp is required which will engage the flange and web of a hull rib and secure a metal strap or cable in place whether the metal strap or cable is holding a concentrated piece of cargo or is holding a fungible cargo baffle plate. It is toward an improvement in this type of ship clamp which our invention is directed.

The ribs of a ship are elongate vertical members, usually Z-bars, channels, or bulb bars, to which the skin of the ship is welded or riveted. In any event, as viewed from the inside of the hold, a typical rib is formed with an outboard flange secured to the skin, a web arranged to lie perpendicular to the plane of the skin, and an inboard flange spaced from and parallel to the skin. The typical ship clamp overlies the inboard flange and a portion of the web and is secured thereto with a wedge, set screw, or pair of jaws. A hook or eye usually protrudes from the end of the clamp in order that a strap or cable may be secured thereto. One disadvantage which we have found to exist in the conventional ship clamp resides in the means provided to secure the clamp to the hull rib. Thus, the hold of a ship may be quite deep and, in lining the hold or constructing the temporary timber baffles, a workman must be supported by temporary staging, suspended from a sling, or otherwise insecurely positioned adjacent the hull ribs to work thereon. In such a precarious position, it is difficult to thread a heavy screw or nut and cinch it tight, strike a heavy hammer blow or exert a large leverage with a prybar. Therefore, the conventional ship clamp, with its associated set screw or wedge and inherent heavy construction, is difficult to secure in place. Furthermore, the distance between the ship skin and inboard rib flange is often nine inches or less. Such a restricted distance limits the amount of force which can be generated to secure the ship clamp in place with a blow from a maul. Accordingly, one object of our invention is to provide a ship clamp, which is secured in place on a hull rib in two separate operations the first of which easily can be accomplished by a workman confined to a small work area while suspended from a sling. The first step practiced to secure our clamp involves a mere tacking operation so the clamp will not slide down the vertical rib. Thus, a workman need not attempt to thread a heavy set screw or nut or drive a maul while supported precariously. The second step follows automatically after the workman has been hauled to safety. When a cable or strap is placed in the hook or eye of the clamp and tensioned, as with a "comealong," the tension increases the grip of our ship clamp on the rib and securely fastens the same in place.

One object of our invention is to provide a two piece ship clamp for gripping the web and inboard flange of a hull rib, which clamp is provided with a tunnel in the terminal end thereof for increasing the grip of the clamp on the rib when a pull is applied substantially parallel to the tunnel axis.

Yet another object of our invention is to provide a clamp for a structural member, which clamp comprises an elongated keeper member and with a tunnel. These elements are tapered complementarily so the keeper, in sliding through the tunnel, will increase the grip of the clamp on the structural member in direct proportion to the amount of pull applied to the keeper member.

Figure 2:
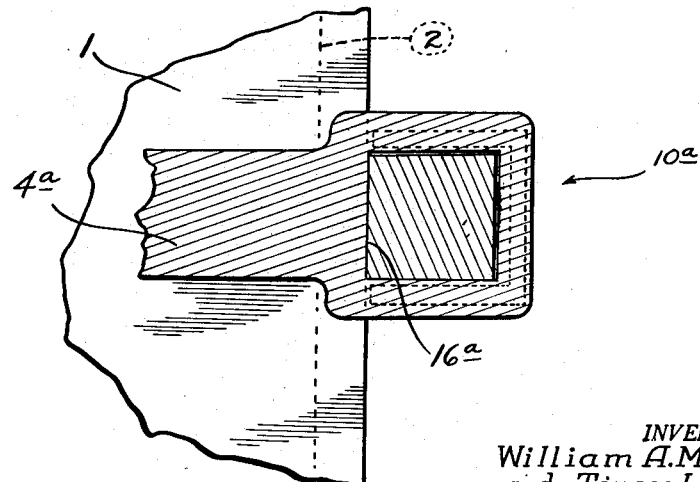

These and other objects and advantages of our invention will appear in the following detailed description taken in connection with the accompanying drawings, in which:

Fig. 1 is a perspective view, with a hull rib shown partially in section, indicating the manner in which our tunnel ship clamp grips both the flange and web of the hull rib, said view being taken with the keeper member in fully extended and in full gripping position; and Fig. 2 is a section view taken substantially on the line 2—2 of Fig. 1, showing the manner in which the keeper member bears upon the flange of the hull rib to apply purchase to the ship clamp, the amount of overlap of the web of the rib having been exaggerated slightly for clarity.

As shown, our invention is adapted to grip a ship hull rib or other structural member having an inboard flange 1 and a web 2. To this end, a two piece clamp is provided and the first piece is defined by a U-shaped body having a first or short outboard leg 3a and a second or long inboard leg 4a joined by a connecting section 5a. These legs are parallel and are spaced one from another a distance substantially equal to the thickness of the flange 1. Thus, the short leg 3a has an overall length less than the length of the flange so the connecting end section 5a will abut the end of the flange when a purchase is applied to the clamp through the tapered tunnel 10a as hereinafter will be described.

The second piece of the two piece clamp is defined by an elongated keeper member 11a which is provided with a hook 15a at one end and with a rear tool engaging face 17a at the other end. As shown in Fig. 1, the hook 15a is formed with a large radius and the curved sweep thereof is sufficient to clear the length of the aforementioned tapered tunnel 10a when the keeper member first is assembled with the U-shaped body. That is to say, when the keeper member 11a is to be inserted through the tapered tunnel 10a, the keeper first is turned up at an oblique angle to the tunnel and the end of the hook 15a is inserted through the tunnel. Thereafter, the keeper is turned downwardly somewhat as the hook is pushed inboard and the end of the hook is threaded on through the tunnel and into an initial gripping position with respect to the aforementioned web 2.

Turning now to a comparison of Figs. 1 and 2, it will be seen that the tunnel 10a and the keeper 11a are tapered in a complementary configuration and the inner face of the keeper is provided with an elongated jaw or flat contact portion 16a. Further as indicated by the exaggerated overlap in Fig. 2, the effective length of the long leg 4a is such that the left wall of the tunnel 10a overlaps the web 2. That is to say, the tunnel is four-sided and the effective length of the long leg 4a, from the left wall of the tunnel to the connection section 5a, is less than the length of the flange 1 whereas the effective length, from the opposite or right wall of the tunnel to the connecting section 5a, is greater than the flange length. Accordingly, when the rear tool engaging face 17a is tapped slightly with a hammer or is moved with a slight prybar pressure, the tapered keeper member 11a is caused to contact both the tunnel 10a and the web 2. Thus, the flat jaw 16a comes to grip with the rib 2 initially to tack the clamp in place. Thereafter, an increased pull on the hook 15a or an increased push on the face 17a will force the connecting section 5a more tightly against the end of flange 1. Furthermore, the greater the force that is exerted upon the tool engaging face 17a or hook 15a, the tighter the keeper member will be wedged between the side of tunnel and the web to secure the ship clamp in place.

In use, it will be noted that the axis of the tapered tunnel 10a is arranged substantially perpendicular to the plane of the flange 1. Thus, the effective axis of the keeper member 11a also is perpendicular to the flange in the operative position of the former. As a first step, while suspended from a sling or the like, the workman will place the U-shaped body 3a, 4a, 5a in position encompassing the flange 1 of the rib. Thereafter, he will insert the tapered keeper member 11a through the tapered tunnel 10a by threading the hook 15a through the tunnel. To tack the clamp in place, he either will pull upon the hook 15a or tap lightly upon the rear tool engaging face 17a. When the keeper member 11a finally is to be driven or pulled into place within the tunnel 10a, the jaw 16a is caused to grip the web 2 by the application of a purchase to the leg 4a to draw the connecting section 5a tightly and forcefully against the end of the flange 1. This final tightening or securing, of course, can be effected by looping a cable over the hook 15a and applying a tension thereto. With this arrangement, the greater the tension, the tighter is the grip of the clamp. On the other hand, the final tightening can be effected by striking the face 17a with a hammer, if enough room is afforded, or by moving the keeper with a prybar. In any event, it will be seen that the workman easily can tack our novel clamp in place while suspended in a sling or while standing upon a precarious support. Thereafter, the workman can be hauled to safety before the clamp is locked in place and tightened since the cable, rope or strap easily is utilized as the tightening medium.

Our invention is of particular utility when employed to secure metal straps or cables to the ribs of a cargo vessel in that novel features thereof allow a workman to tack or fix the ship clamp in position while the worker is suspended from a sling or other insecure support. Thus, in accord with the objects of our invention, we have provided a two-piece ship clamp which grips the web and flange of a hull rib and which is provided with a tunnel means for increasing the grip of the clamp on the rib web when a force is applied perpendicular to the plane of the rib flange. We have further provided a ship clamp with an elongated tapered keeper member which coacts with a tapered tunnel to grip the web of a hull rib and obtain purchase therefrom to draw the clamp against the rib flange. Each of these advantages and objects is cumulative in providing a ship clamp which requires a minimum application of force to effect an initial grip on a cargo hull rib yet which grips more tightly as an increased strain is imparted thereto.

We claim:

1. A two piece ship clamp for gripping the web and inboard flange of a ship hull rib, comprising a U-shaped body having one short leg and one long leg joined by a connecting section, said legs being spaced apart and having their opposed faces arranged parallel with each other over substantial areas, said long leg terminating in a tapered tunnel the axis of which lies substantially perpendicular to the plane of said flange, and an elongated tapered keeper with a rear tool engaging face of greater cross sectional area than that of the remainder of said keeper, said keeper being slidably mounted in said tapered tunnel, said keeper carrying jaw means adjacent the outboard end thereof adapted to grip said web for applying purchase to said tunnel and long leg in a direction drawing said connecting section against the end of said flange.

2. A two piece ship clamp for gripping the web and inboard flange of a ship hull rib, comprising a U-shaped body having one short leg and one long leg joined by a connecting section, said legs being spaced apart and having their opposed faces arranged parallel with each other over substantial areas, said long leg terminating in a tapered tunnel the axis of which lies substantially perpendicular to the plane of said flange, and an elongated tapered keeper slidably mounted in said tapered tunnel, said keeper carrying jaw means adjacent the outboard end thereof adapted to grip said web for applying purchase to said tunnel and long leg in a direction drawing said connecting section against the end of said flange, the inboard end of said keeper terminating in an engagement means for pulling said keeper into said tunnel to increase the grip of said clamp on said flange and web.

3. A two piece ship clamp for gripping the web and inboard flange of a ship hull rib, comprising a U-shaped body having one short leg and one long leg joined by a connecting section, said legs being substantially parallel and being spaced the approximate thickness of said flange to adapt the legs to closely encompass the flange with the connecting section gripping the flange end, said long leg terminating in a tapered tunnel the axis of which lies substantially perpendicular to the plane of said flange, and an elongated tapered keeper slidably mounted in said tapered tunnel, said keeper carrying jaw means adjacent the outboard end thereof adapted to grip said web for applying purchase to said tunnel and long leg in a direction drawing said connecting section against the end of said flange, the inboard end of said keeper terminating in an engagement means for pulling said keeper into said tunnel to increase the grip of said clamp on said flange and web.

4. A two piece ship clamp for gripping the web and inboard flange of a ship hull rib, comprising a U-shaped body having one short leg and one long leg joined by a connecting section, said legs being substantially parallel and being spaced the approximate thickness of said flange to adapt the legs to closely encompass the flange with the connecting section gripping the flange end, said long leg terminating in a tapered tunnel the axis of which lies substantially perpendicular to the plane of said flange, and an elongated tapered keeper with a rear tool engaging face slidably mounted in said tapered tunnel, said keeper carrying jaw means adjacent the outboard end thereof adapted to grip said web for applying purchase to said tunnel and long leg in a direction drawing said connecting section against the end of said flange, the inboard end of said keeper terminating in a hooked engagement for pulling said keeper into said tunnel to increase the grip of said clamp on said flange and web.

5. A two piece clamp for gripping the flange and web of a structural member, said clamp comprising; a first piece defined by a U-shaped body having one short leg and one long leg joined by a connecting end section, said legs being parallel and being spaced a distance substantially equal to the thickness of said flange, said short leg having a length less than the length of said flange to adapt the legs closely to encompass the flange with the connecting end section abutting the end of the flange, said long leg terminating in a walled tapered tunnel the axis of which lies parallel the plane including both of said legs, the effective length of said long leg from one wall of said tunnel to said connecting section being less than the length of said flange and the effective length from the opposite wall of said tunnel to said section being more than the flange length, and a second piece defined by an elongated keeper means tapered complementary to said tunnel slidably to fit therein.

6. A two piece clamp for gripping the flange and web portions of a structural member, said clamp comprising; a first piece defined by a U-shaped body having parallel first and second legs joined by a connecting section, said second leg terminating in a tapered tunnel which is carried with the axis thereof parallel the plane including said parallel legs, the length of said second leg plus the width of said tunnel being greater than the length of said flange but the length of said second leg being less than the length of said flange, and a second piece defined by an elongated keeper means tapered slidably to fit within said tunnel with a force fit.

References Cited in the file of this patent

UNITED STATES PATENTS

| Number | Name | Date |
|---|---|---|
| 986,860 | Quinlan | Nov. 14, 1911 |
| 1,313,747 | Sims | Aug. 19, 1919 |
| 1,332,442 | Kane | Mar. 2, 1920 |
| 2,429,969 | Wasco | Oct. 28, 1947 |
| 2,609,761 | Clark | Sept. 9, 1952 |

FOREIGN PATENTS

| Number | Country | Date |
|---|---|---|
| 152,473 | England | Oct. 21, 1920 |